May 4, 1965 H. C. OPPEL 3,181,616
DIGGING WHEEL FOR SUGAR BEET HARVESTERS
Original Filed Dec. 29, 1958 2 Sheets-Sheet 1

INVENTOR.
Heinz Carl Oppel
BY Wells & St. John
Attys.

May 4, 1965   H. C. OPPEL   3,181,616
DIGGING WHEEL FOR SUGAR BEET HARVESTERS
Original Filed Dec. 29, 1958   2 Sheets-Sheet 2
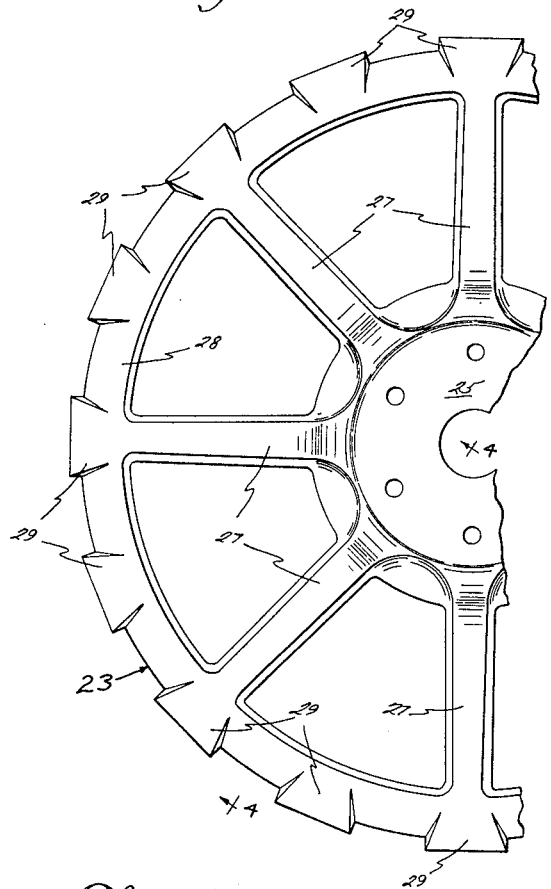
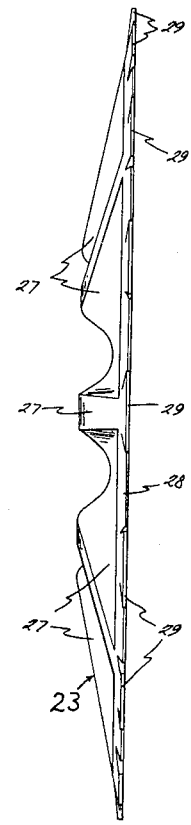
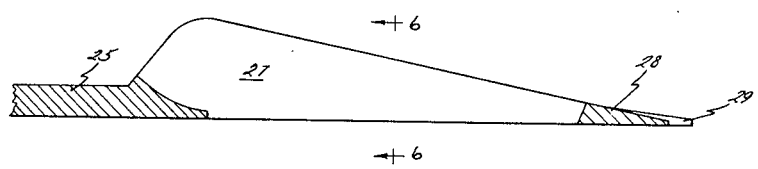
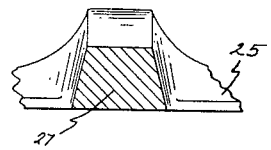
INVENTOR.
*Heinz Carl Oppel*
BY *Wells & St. John*
Attys.

United States Patent Office 3,181,616
Patented May 4, 1965

3,181,616
DIGGING WHEEL FOR SUGAR BEET HARVESTERS
Heinz Carl Oppel, 212 S. 5th St., Boise, Idaho
Original application Dec. 29, 1958, Ser. No. 784,841, now Patent No. 3,010,522. Divided and this application Aug. 14, 1961, Ser. No. 131,209
3 Claims. (Cl. 171—58)

This invention relates to a novel digging wheel for sugar beet harvesters. The present application is a divisional application of my co-pending application Serial No. 784,841, filed December 29, 1958 for Beet Harvester, now Patent No. 3,010,522, issued Nov. 28, 1961.

A first object of this invention is to provide digging wheels for a sugar beet harvester capable of lifting beets from the ground when properly mounted on a harvester as shown in my above-identified disclosure.

It is another object of this invention to provide a digging wheel capable of utilizing improved traction in ground contact. Such traction is assured by projecting lugs which extend radially from a circular wheel rim, and by unique spoke configurations.

It is a final object to provide a wheel which will remain in a clean condition under normal usage. This result is accomplished by a spoke design which virtually eliminates the tendency of soil to pack between spokes.

The nature and advantages of the invention will appear more clearly from the following description and the accompanying drawings, wherein a preferred form of the invention is shown. The description and drawings are illustrative only, however, and are not intended to limit the invention except insofar as it is limited by the claims.

In the drawings:

FIGURE 3 is a fragmentary elevational view of a digging wheel;

FIGURE 4 is a sectional view taken along line 4—4 in FIGURE 3;

FIGURE 5 is an edge view of the wheel; and

FIGURE 6 is an enlarged fragmentary sectional view taken along line 6—6 in FIGURE 4.

Figure 1:
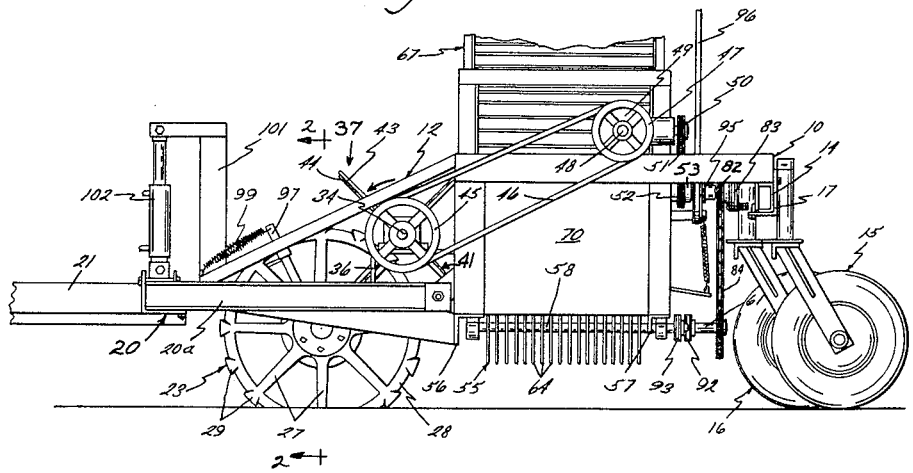
FIGURE 1 is a side elevational view of the sugar beet harvester showing the digging wheels in operation.
Figure 2:
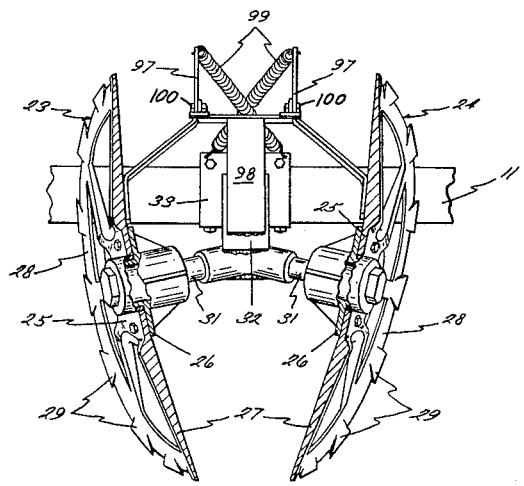
FIGURE 2 is an enlarged vertical section of the wheel assembly as seen in FIGURE 1 taken along line 2—2.

Referring now to the drawings, the present invention concerns digging wheels for a sugar beet harvester such as that fully described in the above-mentioned disclosure. The features with which this invention must be correlated are shown in FIGURES 1 and 2. The main supporting framework 10 comprises a front transverse beam 11, side frames 12 extending rearwardly therefrom, and a rear transverse beam 14. This main framework carries the several components which comprise the complete harvester. Framework 10 is supported at the rear by caster wheels 15, 16 that are secured by clamps 17 to the rear transverse beam 14.

The front of framework 10 is supported rigidly by a towing vehicle (not shown) by a tow frame 20, having pivoted legs 20a mounted on side frames 12 intermediate beams 11 and 14. Draft arms 21 are adapted to be rigidly fixed to the towing vehicle. This provides a rigid frame connection with the towing vehicle.

Digging wheels 23, 24 are directly behind beam 11. The digger wheels 23 and 24 are illustrated best in FIGURES 3, 4, 5 and 6. As shown in these figures, each wheel 23 and 24 includes a central portion 25 having suitable apertures therein through which bolts are extended to secure the wheel 23 or 24 to a hub 26. Radial spokes 27 extend outwardly from the central portion and connect to a rim 28. As illustrated in FIGURE 6, the spokes are trapezoidal in cross section, the inner faces thereof being substantially wider than the outer faces. This construction prevents packing of dirt and rocks between the spokes 27. The spokes 27 also increase in thickness from their outer ends inwardly, to provide strength against breaking when rocks or other hard objects are caught between the wheels 23 and 24. The rim 28 tapers outwardly as shown in FIGURE 4, to provide a substantially narrow outer edge for penetration of the soil. The rim includes a plurality of radial lugs 29 which extend a short distance beyond the periphery of the rim itself. As illustrated in FIGURES 3 and 4, these lugs are somewhat thicker than the body of the rim and project upwardly from the outer face. I have found that a wheel having such a continuous rim 28 with lugs 29 thereon does a better digging and lifting operation, and has better traction with the soil than either the spike wheel type digger, or the digging wheel having an uninterrupted rim.

The hubs 26 to which the digging wheels 23 and 24 are mounted, are journalled on stub shafts 31 which are carried by rearwardly and downwardly extending standards 32. The details of mounting the wheels 23 and 24 to the stub shafts 31 will not be described herein, since suitable mounting means for such digging wheels are disclosed in detail in my prior Patent No. 2,772,343. Such mounting means are entirely satisfactory for the wheels 23 and 24. The digging wheel supporting standards 32 have clamps 33 at their forward ends by which they are rigidly secured to the front transverse beam 11. When the clamps 33 are loosened, the standards 32 may be adjusted transversely along the beam 11 to match the row spacing in the field from which the beets are harvested.

It will be noted that the stub shafts 31, which carry the wheels 23 and 24, are inclined downwardly and rearwardly so that the wheels 23 and 24 are angularly disposed with respect to the frame 10 and with respect to each other. The point of minimum separation of the wheel rims 28 is spaced rearwardly and upwardly from the point of maximum soil penetration thereof, as has been found necessary to permit the wheels 23 and 24 to properly perform their digging and lifting function. The wheels 23 and 24, being thus disposed, engage and lift beet roots from the soil and elevate them thereabove.

Above wheels 23, 24 and substantailly tangent to their rear edges, is a cross shaft 34 which is suitably journalled on framework 10 by means of brackets 36 on side frames 12. Cross shaft 34 has fixed thereto a plurality of flexible flailing devices generally indicated at 37, each flailing device 37 being associated with each pair of wheels 23, 24. The shanks 43 of each flailing device are provided with ribs 44 on the leading faces thereof. Cross shaft 34 has a pulley 45 at one end which is connected by a belt 46 to a drive pulley 47. Pulley 47 is connected to the output shaft 48 of a gear box 49, powered through sprocket 50 and chain 51 from a driving sprocket 52 mounted on a forwardly extending main drive shaft 53. Shaft 53 is driven by the power take-off of the towing vehicle.

The drive mechanism just described rotates the shaft 34 in the direction of the arrow in FIGURE 1, and causes the four groups of flails 41 to be whirled between the wheels 23 and 24 in rapid succession. The flails 41 strike beet roots lodged between the wheels 23 and 24 and carry them rearwardly therefrom. I have found that the flexible flails 41, when whirled rapidly, strike the beet roots with sufficient force to knock most of the dirt therefrom and thus perform a cleaning action as well as dislodging the beets from the digging wheels. The flexibility of the flails 41 prevents undue injury to the beet roots as they are struck.

Behind the digging wheels 23 and 24 is a cleaning device generally indicated at 55. This unit includes a pair of longitudinally spaced frame members 56, 57 which extend between the frame members 12. Shafts 58 are provided between frame members 56, 57 are are journalled therein. Shafts 58 carry toothed rotors 64, which jostle the beets thrown from wheels 23, 24 by the flailing devices 37. The beets are confined on the cleaning device by a barrier 70.

Rotor shafts 58 are driven by the previously described shaft 53. Shaft 53 drives a sprocket 82 by means of a slip clutch 83. Drive sprocket 82 entrains a drive chain 84 which turns a sprocket 85 on the central rotor shaft 61. Shaft 61 drives rotor shaft 58 by means of intermediate sprockets 92, 93.

The beets are elevated on a conveyor 67, driven from shaft 53 by a pulley 95 and a belt 96.

One of the greatest problems to be overcome in beet harvesters of this type is the problem of dirt and mud accumulation on the machine and particularly on the digging wheels 23 and 24. This problem is quite serious, especially when the soil is moist and packs easily. As hereinbefore described, my improved wheels 23 and 24 do not readily lend themselves to soil accumulation due to their unique construction. Also the rapidly whirling flails 41 which brush against the rims 28 of the wheels 23 and 24 keep the rims 28 free of clods and dirt accumulation. The only place that dirt can accumulate on the wheels 23 and 24 is in the central portions 25 around the hubs 26. To keep these portions free of dirt accumulation, I provide novel scrapers 97. As illustrated best in FIGURES 1 and 2, the scrapers 97 are pivoted to brackets 98 supported on the standards 32 which support the wheels 23 and 24. Each of the scrapers 97 has a spring 99 which extends forwardly therefrom to the clamp means 33 at the forward end of the standard 32. The springs 99 normally hold the scrapers 97 against stop bars 100 mounted on the bracket 98 but allow the scrapers 97 to yield forwardly to pass any rocks or clods that may be wedged tightly in the wheels 23 and 24 so that jamming or breakage is prevented.

I have found that a device constructed in accordance with my invention as hereinbefore described operates easily and efficiently to dig, clean and load beets. The main frame 10 of the harvester being rigidly mounted to the towing vehicle, and supported at the rear by the caster wheels 15 and 16 is easily handled in the field for best results. The construction and mounting of the wheels 23 and 24 to the frame 10 permits the wheels to travel along the beet rows smoothly to dig and elevate the roots without undue injury, and without sliding or clogging. The wheels 23 and 24 may be readily adjusted to the proper digging depth by angular adjustment of the main frame 10 with respect to the tow frame 20. As illustrated best in FIGURE 1, the main frame 10 has an inverted L-shaped bracket 101 thereon which is rigidly connected to the tow bar 20 by means of an hydraulic cylinder 102 to support the frame 10 at the proper level.

By vertical adjustment of the cylinder 102 the digging level may be changed.

The above description of the novel digging wheels provides an efficient working combination for the removal of sugar beets without damage to the resulting crop. Various modifications may occur to those in this field in view of this disclosure. Therefore the scope of my invention is to be determined only by the following claims.

Having thus described my invention, I claim:

1. In a harvester for beets and like crops having a frame, a standard carried thereby, and a pair of laterally outwardly and downwardly extending axles fixed on said standard, digging wheels rotatably mounted on said axles, said wheels comprising a central portion, a plurality of radial spokes extending outwardly from the central portion, said spokes being trapezoidally shaped in cross section with wide flat faces facing inwardly and narrowing in width to their outer faces, a rim integral with said spokes, said rim tapering outwardly to a thin peripheral edge, and a plurality of lugs on said rim extending radially beyond the outer peripheral edge thereof, said lugs being thicker than the rim and extending outwardly beyond the outer face of the rim.

2. The invention set forth in claim 1 wherein the inner face of each lug is coplanar with the inner face of the rim.

3. In a beet harvester having a mobile frame and a pair of forwardly diverging beet digging and elevating wheels having hubs pivotally supported on said frame and means cooperating with said wheels to remove beets rearwardly of said wheels, a wheel construction comprising a central portion affixed to the wheel hub, a plurality of spokes extending outwardly from the central portion, said spokes being trapezoidally shaped in cross section with wide flat faces facing inwardly toward the other wheel and narrowing in width to the outer faces of the spokes, a rim integral with said spokes, said rim tapering outwardly to a thin peripheral edge, and a plurality of lugs on said rim extending radially beyond the outer peripheral edge thereof, said lugs being thicker than the rim and extending outwardly beyond the outer face of the rim.

References Cited by the Examiner
UNITED STATES PATENTS

| | | | |
|---|---|---|---|
| 1,673,184 | 12/28 | Cady | 172—555 X |
| 2,357,528 | 9/44 | Lutes | 172—604 X |
| 2,773,343 | 12/56 | Oppel | 171—58 |
| 3,017,933 | 1/62 | Oppel | 171—58 |

FOREIGN PATENTS 261,878   12/26   Great Britain.

ANTONIO F. GUIDA, *Acting Primary Examiner.*

CARL W. ROBINSON, ABRAHAM G. STONE, ARNOLD RUEGG, *Examiners.*